United States Patent [19]
Huschka et al.

[11] 3,978,177
[45] Aug. 31, 1976

[54] PROCESS FOR THE PRODUCTION OF GRAPHITE MOLDING POWDER

[75] Inventors: Hans Huschka, Grossauheim; Werner Heit; Franz-Josef Herrmann, both of Niederrodenbach; Gerhard Spener, Hanau, all of Germany

[73] Assignee: Hobeg Hochtemperaturreaktor-Brennelement GmbH, Germany

[22] Filed: Sept. 25, 1974

[21] Appl. No.: 509,343

[30] Foreign Application Priority Data
Sept. 26, 1973 Germany............................ 2348282

[52] U.S. Cl............................. 264/.5; 252/301.1 R
[51] Int. Cl.²......................................... G21C 21/00
[58] Field of Search................. 264/.5; 252/301.1 R

[56] References Cited
UNITED STATES PATENTS

| 3,439,073 | 4/1969 | Howard et al. | 264/.5 |
| 3,558,750 | 1/1971 | Davis et al. | 264/.5 |
| 3,792,136 | 2/1974 | Schmitt | 264/.5 |

Primary Examiner—Stephen J. Lechert, Jr.
Attorney, Agent, or Firm—Cushman, Darby & Cushman

[57] ABSTRACT

Graphite molding powders are prepared which contain phenol-formaledehyde as a binder and which are intended for use in the manufacture of graphite molded articles, especially fuel inserts, fuel elements and absorber elements for high temperature reactors by mixing a graphite powder with a phenol formaldehyde binder and subsequent heat treatment, in a given case in admixture of coated fuel, fertile or absorber particles. The invention resides in not adding to phenol-formaldehyde as such to the graphite powder but as the starting components namely phenol and formaldehyde or source of formaldehyde and heating the mixture to the resin condensation temperature.

9 Claims, No Drawings

PROCESS FOR THE PRODUCTION OF GRAPHITE MOLDING POWDER

The invention is directed to a process for the production of graphite molding powders and graphite molding materials which contain phenolic resins, i.e., phenol-formaldehyde resins, as binders and which are intended for use in the manufacture of graphite molded articles, especially fuel inserts, fuel elements or absorber elements for high temperature reactors by mixing a graphite powder with a phenol-formaldehyde resin binder and subsequent heat treating this mixture.

For the production of graphite molded articles there are used as starting materials for pressing the molded article powdery or plastic moldable graphite molding materials which are composed of a carbon filler and a carbonizable binder. For many uses, especially for the production of fuel containing graphite molded articles and fuel elements for high temperature nuclear reactors, there are employed graphite powder as the filler and phenol-formaldehyde resin as the binder. It has also been proposed to use pitch or furfuryl alcohol for the same purpose as a binder. However, it has been shown that phenol-formaldehyde resins using suitable methods of production form molded articles with better properties, especially higher strength.

In the graphite-fuel elements for high temperature reactors differentiation is made between fuel free regions, structural graphite and fuel containing regions which consist of a graphite matrix in which the coated nuclear fuel particles are embedded. The nuclear fuel particles usually consist of oxides or carbides of uranium and/or thorium having a diameter of 0.2 to 0.8 mm. They are coated with several gastight, fission product retaining layers of pyrolytically deposited carbon and/or silicon carbide. With molded spherically shaped and block shaped fuel elements both structural graphite and matrix graphite are produced from the same molding powder by stepwise molding the fuel element body, heating up to 800° – 1000°C thereby calcining the binder material, and subsequent heat-treatment at 1800° – 2000°C in vacuum. For production of the fuel containing region a portion of the graphite molding powder is used which encases the coated fuel particles intended for embedding in a dragee process in order to use these encasing layers to avoid injury to coated particles located on the mold wall or piled on top of each other in the subsequent molding process. The production of graphite molding powder therefore has an important influence on the industrial manufacture of such fuel elements.

The production takes place in a series of somewhat quite expensive working steps. Phenol-formaldehyde resin in specific concentration is dissolved in an alcohol, preferably methyl alcohol, and mixed in a kneader with the graphite filler the necessary ratio. The kneaded material is then discharged and carefully dried at defined temperature and then ground and sieved.

The phenol-formaldehyde resin additionally must be produced auxiliarily in its own large scale plant. It is generally obtained by reacting a mixture of phenol and formaldehyde with an acid catalyst. The synthesis is carried out in large heated kettles. By a steam distillation and a vacuum distillation connected thereto, the unconsumed starting components are removed. Then the molten resin is discharged, broken up, ground and sieved. Since the phenol-formaldehyde resin must have certain properties for the production of graphite molding powder, specifications requiring expensive testing are necessary. Because of this the resin production likewise is an expensive working step in the overall production of the graphite molding powder. A further disadvantage in the production of the phenolic resin is that unavoidable quality fluctuations occur from batch to batch. These fluctuations definitely effect the strength properties, the density and consequently the heat conductivity and the corrosion behavior of the fuel elements.

These disadvantages in the production of graphite molding powders and graphite molding masses — which are destined for the manufacture of graphite molded articles, especially fuel inserts, fuel elements and absorber elements for high temperature reactors — by mixing graphite powder with a phenolic resin binding agent and subsequent heat treatment, in a given case with the admixture of coated fuel particles, fertile material or absorber particles, can be avoided by the treatment, according to the invention, whereby phenol formaldehyde resin itself is not added to the graphite powder, but instead the starting components of a phenol resin are added, and whereby through heating the mixture up to the resin condensation temperature the phenol formaldehyde resin is formed in situ.

As starting components there can be used, the customary compounds employed in the synthesis of phenolic resins. However, there have proven especially good, the starting material combination of phenol and formaldehyde and phenol and hexamethylene tetramine. Instead of phenol other phenolic compounds can be used e.g. cresol, resorcin, cresylic acid or the like. Other sources of formaldehyde can be used e.g., trioxane and paraformaldehyde. According to the invention the process begins with the non-condensated starting components which exist as monomers in an exactly defined molecular structure and in an exactly known proportional distribution — namely 100% monomer — whereas each partially or fully condensated resin cannot be defined exactly.

The starting components employed, for example, phenol and formaldehyde or hexamethylene tetramine themselves, are not binders and as individual components cannot be condensed or polymerized to form binders nor do they give a binder coke upon heating. The good properties as a binder which later upon heating after the pressing of the molded object give a good binder coke are rather only produced if both starting components, phenol and formaldehyde or hexamethylene tetramine are condensed to a phenolic resin before the pressing.

Said starting components are mixed with the graphite filler under such conditions (time and temperature) as are required for the reaction between the components to the desired degree of condensation. Connected thereto there is eventually removed any solvent which is present, water formed in the reaction and unused starting material by drying. Drying is eliminated, however, if there are employed phenol and hexamethylene tetramine (or trioxane or paraformaldehyde) as the starting components.

The use of one or another combination of starting materials depends on the requirement which are placed on the properties of the finished graphite molded article. As the last processing step there is generally a milling to the desired particle size.

The process of the invention provides a definite simplification in the production of graphite molding powder and furthermore offers substantial industrial advantages.

For example, there is is eliminated the expensive production of the phenolic resin in a special working operation wherein the cost of the binder is reduced by about a factor of 4.

In the phenolic resin synthesis according to the customary processes, the condensation in most cases proceeds very stormily because of the strong exothermicity of this reaction and is therefore controlled only with difficulty. This is probably the chief cause for the charge dependent fluctuation in quality which is very disturbingly noticeable in the production of fuel elements which are subject to very strict specifications.

Simple aromatic compounds such as the phenols, e.g., phenol per se, cresol, cresylic acid or the like are well absorbed on the graphite surface. Therefore, in all probability, the process according to the invention works by synthesizing the phenolic resin in an interface reaction and consequently the binding agent formed of the suggested nuclear structure is better adjusted and a more uniform coating of the graphite kernels is attained. The graphite consequently acts, apart from its effect as a diluting agent, to control the course of the reaction. This leads to a very good reproducibility in the production of graphite molded objects.

It has been surprisingly found that the condensation reaction converts from an endothermic into an exothermic reaction at about a 30° to 50°C. lower temperature (for example, at 105°C. instead of 140°C. for phenol-hexamethylene tetramine), dependent upon the mixture and size of the charge, if the condensation takes place with graphite present rather than homogeneously. This shows the catalytic effect of the graphite on the condensation reaction.

Phenol resins normally consist of a spectrum of compounds which differ in molecular weight and type of linkages. In contrast thereto according to the process of the invention for producing molding powders only simple chemically exactly defined compounds are added. The previously required expensive resin characterization processes are thereby eliminated.

The use of phenol and hexamethylene tetramine has shown that in comparison to the normally protracted phenolic resin synthesis very short reaction times in the presence of graphite powder are sufficient, e.g. 15 to 45 minutes. The process of the invention therefore is of especial advantage for continuous working in the production of molding powder.

In the production of the graphite molding powder according to the invention the degree of condensation of the phenolic resin, and consequently the working properties of the molding powder, can be regulated within fixed limits by control of the reaction through the temperature and time of reaction conditions, in a given case also in the subsequent drying. Thus, the optimum properties of the molded articles produced from the molding powder can be attained for each use.

In the production of fuel elements with synthetic resin bonded graphite matrices the coated fuel and fertile particles are encased by graphite molding powder in a separate operating step. The uniform setting up of the molding powder presents especial difficulties in this encasing process. For this reason, this process step cannot be automatized but requires uninterrupted supervision by a skilled coater. Furthermore, there can only be produced uniformly thick encasing layers on all particles of a charge with coating drums of very small capacity.

Surprisingly it has been found that by simply mixing the particles of the fuel or fertile material with a molding powder of graphite filler, phenol and hexamethylene tetramine there can be produced a graphite molding mass which results in a good bonding and uniform distribution of the particles in the graphite matrix in the subsequent molding. By addition of some solvent, as, for example, acetone, the uniform introduction of the particle is still further improved. The use and expense of encasing in the coating drum is therefore eliminated.

On the one hand, with these fuel particles containing molding masses, there are molded the spherically shaped nuclear molded articles for spherical fuel elements on which the fuel-free shell is applied with fuel particle free molding powder. On the other hand, there can also be produced cylindrical molded articles either for insertion in the bores of prefabricated prismatic graphite blocks or for insertion in the corresponding channels of a prismatic block, which is rough pressed from the same, but fuel-free, molding powder and which then at higher pressure is finally pressed to a monolithic block element. With coated or uncoated absorber particles in a corresponding manner, there can be produced spherical or cylindrical absorber elements.

Unless otherwise indicated, all parts and percentages are by weight.

The following examples further explain the invention.

EXAMPLE 1

In a heatable kneader which is provided with a reflex condenser, there were mixed 2,800 grams of graphite powder consisting of 4 parts of natural graphite powder and 1 part of graphitized petroleum coke powder with a solution of 700 grams of phenol, 570 grams of a 35% aqueous solution of formaldehyde and 700 grams of water. After a kneading time of 30 minutes, there were added 150 ml of 5.6% hydrochloric acid. Then the mixer was heated to 100°C., and held at this temperature for 3 hrs. Subsequently, the kneaded product was dried at 105°C in a drying oven 16 hrs. with air one hour with flowing nitrogen and one hour under vacuum and then ground in a hammer mill to a particle size of less than 0.3 mm.

With the thus obtained molding powder, there were first encased fuel particles of uranium-thorium oxide of 400 $\mu$m diameter, coated with layers of pyrolytic carbon (total layer thickness 150 $\mu$m) the additional encasing layer reaching a thickness of about 200 $\mu$m and with these encased particles and additional molding powder, there were produced by molding in rubber molds at 3000 kp/cm$^2$ spherical fuel elements having a diameter of 6 cm which had a pressed on particle free 5 mm thick shell on a particle containing nucleus. After the carbonization and a high temperature treatment in a vacuum at 1900°C, it had a graphite density of 1.73 gm/cm$^3$ and a crushing load of 2300 to 2400 kp.

EXAMPLE 2

A powdery mixture of 6.4 kg natural graphite, 1.6 kg of electro-graphite, 2.0 kg of phenol and 0.425 kg. of hexamethylenetetramine was mixed in a heatable kneader for 30 minutes at 115°C. To avoid the loss of phenol through vaporization a reflux condenser heated with water to about 50°C was put on the kneader. The kneaded mass was subsequently further worked up as in Example 1. The graphite density of a fuel element sphere produced from the molding powder was 1.75 g/cm$^3$ and the crushing load was 2400 kp.

EXAMPLE 3

There were placed in a paddle mixer 2800 grams of the molding powder produced in Example 2 and also 10 kg of pyrolytic carbon coated (U, Th)O$_2$ particles with addition of some acetone. Subsequently, the mixture was pressed in portions at room temperature to cylindrical fuel inserts in a metal molding die. At a molding pressure of 80 kp/cm$^2$ there was obtained a green compact density for the graphite matrix of 1.2 g/cm$^3$. After the carbonization and high temperature treatment, the molded articles at a particle volume portion of 50% had a matrix density of 1.1 g/cm$^3$. These fuel inserts can then be inserted in the corresponding bores of a prismatic graphite block.

EXAMPLE 4

Cylinders having a diameter of 15 mm were pressed from the mixture of molding powder and particles produced in Example 3 using a molding pressure of 120 kp/cm$^2$ and a time of 15 min. under pressure. They were exactly fitting inserted into the bores of a graphite block. After carbonization and high temperature treatment, the fuel inserts sat firmly in the bores of the graphite blocks.

The graphite molding masses produced according to the invention can also be used to manufacture other graphite molded articles, as for example, electrodes or carbon brushes for collector brushes.

The graphite filler can be 60 to 95%, the phenol 4 to 30% and the formaldehyde or source thereof 1 to 10% of the total weight of starting mixture (without water or other solvent) of the graphite molding powder. Generally, the formaldehyde source is employed in an amount to provide 0.75 to 1.2 moles of formaldehyde per mole of phenol. Thereby the formaldehyde source is present in an amount to provide a non thermosetting resin (novolak) or a thermosetting resin.

When formaldehyde is used per se, it is normally employed dissolved in water, e.g. as formalin, although it can be employed in other conventional solvents for formaldehyde.

What is claimed:

1. A process of preparing a fuel insert, fuel element or absorber element comprising mixing (1) graphite powder, (2) phenol and (3) formaldehyde or a source thereof, heating the mixture to a temperature sufficient to cause (2) and (3) to react and form a molding powder and encasing a member of the group consisting of nuclear fuel particles, fertile particles and absorber particles in the molding powder.

2. A process according to claim 1 including the additional step of molding the encased particles under pressure.

3. A process according to claim 1 wherein (3) is formaldehyde dissolved in water.

4. A process according to claim 1 wherein (3) is a solid source of formaldehyde.

5. A process according to claim 4 wherein (3) is hexamethylenetetramine.

6. A process according to claim 5 consisting of natural graphite, synthetic graphite, phenol and hexamethylenetetramine.

7. A process of preparing a fuel insert, fuel element or absorber element comprising mixing (1) graphite powder, (2) phenol and (3) formaldehyde or a source thereof, heating the mixture to a temperature sufficient to cause (2) and (3) to react and form a molding powder and mixing it with a member of the group consisting of nuclear fuel particles, fertile particles and absorber particles and molding the mixture to form a molded compact and heat treating the molded article to carbonize the reaction product of (2) and (3).

8. A process according to claim 7 wherein said member is encased in the molding powder and the molding is under pressure.

9. The process of claim 7 wherein the heating of (2) and (3) is at 100° to 115°C.

* * * * *